USO10929826B2

(12) United States Patent
Sharma et al.

(10) Patent No.: US 10,929,826 B2
(45) Date of Patent: Feb. 23, 2021

(54) PAYWALL-ENABLED STREAMING CONTENT ONTO SOCIAL PLATFORMS FROM APPLICATION WINDOW

(71) Applicant: DISH Network L.L.C., Englewood, CO (US)

(72) Inventors: Abhijit Sharma, Denver, CO (US); Ryan Gorsuch, Parker, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 15/783,976

(22) Filed: Oct. 13, 2017

(65) Prior Publication Data

US 2019/0114603 A1  Apr. 18, 2019

(51) Int. Cl.
*G06Q 20/12* (2012.01)
*H04N 21/2543* (2011.01)
(Continued)

(52) U.S. Cl.
CPC ....... *G06Q 20/127* (2013.01); *G06Q 20/0855* (2013.01); *G06Q 20/123* (2013.01); *G06Q 50/01* (2013.01); *H04N 21/2187* (2013.01); *H04N 21/2407* (2013.01); *H04N 21/2543* (2013.01); *H04N 21/2665* (2013.01); *H04N 21/26225* (2013.01); *H04N 21/4402* (2013.01);
(Continued)

(58) Field of Classification Search
CPC ........... H04N 21/2187; H04N 21/2407; H04N 21/2543; H04N 21/26225; H04N 21/2665; H04N 21/4402; H04N 21/44204; H04N 21/4542; H04N 21/8358; G06Q 20/127; G06Q 50/01; G06Q 20/123; G06Q 20/0855
See application file for complete search history.

(56) References Cited

U.S. PATENT DOCUMENTS 6,526,577 B1 * 2/2003 Knudson ............ H04N 5/44543
348/E5.104
9,715,901 B1 * 7/2017 Singh ................... G11B 27/034
(Continued)

OTHER PUBLICATIONS

Huff et al, "Online Multimedia Authorization Protocol", Aug. 22, 2012, Open Authentication Technical Committee, Version 1.0 (Year: 2012).*

*Primary Examiner* — Nicholas T Corbo
(74) *Attorney, Agent, or Firm* — Kilpatrick Townsend & Stockton LLP

(57) ABSTRACT

Disclosed herein are systems and methods for paywall-enabled streaming content onto social media platforms. The content can be streamed via a third-party social media interface to a user. The systems can perform the process of providing the video content for display via the third-party social media interface to the user on the client device and determining, after a free viewing period has expired, either that the viewer is already authorized to continue watching through an existing paid subscription or that the viewer may choose to continue watching by making an immediate payment for the content through a paywall that is provided and displayed via the third-party social media interface. After confirmation of payment or an existing paid subscription, the system can provide unobstructed display of the video content via the third-party social media interface.

20 Claims, 11 Drawing Sheets

(51) Int. Cl.

| | |
|---|---|
| *H04N 21/442* | (2011.01) |
| *H04N 21/24* | (2011.01) |
| *H04N 21/2187* | (2011.01) |
| *H04N 21/262* | (2011.01) |
| *H04N 21/454* | (2011.01) |
| *H04N 21/4402* | (2011.01) |
| *H04N 21/2665* | (2011.01) |
| *G06Q 50/00* | (2012.01) |
| *H04N 21/8358* | (2011.01) |
| *H04N 21/4788* | (2011.01) |
| *G06Q 20/08* | (2012.01) |

(52) U.S. Cl.
CPC ... *H04N 21/44204* (2013.01); *H04N 21/4542* (2013.01); *H04N 21/4788* (2013.01); *H04N 21/8358* (2013.01)

(56) References Cited

U.S. PATENT DOCUMENTS

| | | | |
|---|---|---|---|
| 10,171,522 B1* | 1/2019 | Liu | G06Q 50/01 |
| 2002/0170053 A1* | 11/2002 | Peterka | H04N 7/165 |
| | | | 725/31 |
| 2003/0149988 A1* | 8/2003 | Ellis | H04N 5/44543 |
| | | | 725/87 |
| 2010/0306806 A1* | 12/2010 | Kim | H04N 7/17318 |
| | | | 725/61 |
| 2014/0380354 A1* | 12/2014 | Relyea | H04N 21/44222 |
| | | | 725/32 |

\* cited by examiner

PAYWALL-ENABLED STREAMING CONTENT ONTO SOCIAL PLATFORMS FROM APPLICATION WINDOW

BACKGROUND OF THE INVENTION

Most people today have a mobile device that is capable of displaying video content. Many of those people also utilize or access social media through either a website or an application installed on their mobile device. However, there is currently no way to access live broadcast or other paid video content through existing social media interfaces. Therefore, a need exists to utilize the social media platforms that currently hold users' attentions for providing paid and live video content.

BRIEF SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that can be performed by a computer system that includes providing video content for display via a third-party social media interface. The method also includes determining a threshold period of time for free viewing of the video content. The method also includes determining that a user has viewed the video content for the threshold period of time on a client device. The method also includes providing a paywall for display to the user via the third-party social media interface on the client device. The method also includes receiving input from the user via the paywall on the third-party social media interface confirming payment. The method also includes providing unobstructed display of the video content via the third-party social media interface to the user. Other embodiments of this aspect include corresponding computer systems, apparatus, and computer programs recorded on one or more computer storage devices, each configured to perform the actions of the methods.

Implementations may include one or more of the following features. The method may include that display of the paywall obscures the video content in the third-party social media interface for the user. The portion of the method for determining that the user has viewed the video content for the threshold period of time may optionally include receiving an indication of a start time of the user viewing the video content. The method may also include calculating a paywall threshold time based on the start time of the user viewing the video content and the threshold period of time for free viewing. The method may also include determining that a current time is at or beyond the paywall threshold time. The method may also include the method where the video content is a live television broadcast.

Optionally, the method may include that the user is a first user of a plurality of users. The method may also include, for each user of the plurality of users, determining that the user has viewed the video content for the threshold period of time and providing a paywall for display to the user. The method may also include that the video content is a live television broadcast and at least one of the users of the plurality of users began viewing the video content at a different time than other users of the plurality of users.

Optionally, the method may also include that the user shares the video content with a second user via the third-party social media interface. The method may also include that the user creates a clip of a portion of the video content and shares the clip with a second user via the third-party social media interface. Implementations of the described techniques may include hardware, a method or process, or computer software on a computer-accessible medium.

DETAILED DESCRIPTION OF THE INVENTION

Embodiments described herein include systems and methods for paywall-enabled streaming of content to users via social media platforms. Users are currently utilizing social media platforms regularly for entertainment. For example, users have access to Facebook®, HouseParty®, Twitter®, and other social media sites on most of their electronic devices. For example, applications on mobile phones and tablets allow users to access social media platforms. As another example, users can use a standard browser to access social media platforms in many cases. One advantage of systems and methods provided herein is that the system and methods capitalize on existing systems to capture the attention of the users where they are already focusing much of their attention—in social media platforms. Rather than users having to download an additional application or divert their attention from a social media platform, the users can simply utilize their existing social media applications to view live broadcast, syndicated, and/or other paid video content via their existing social media platforms.

Figure 1:
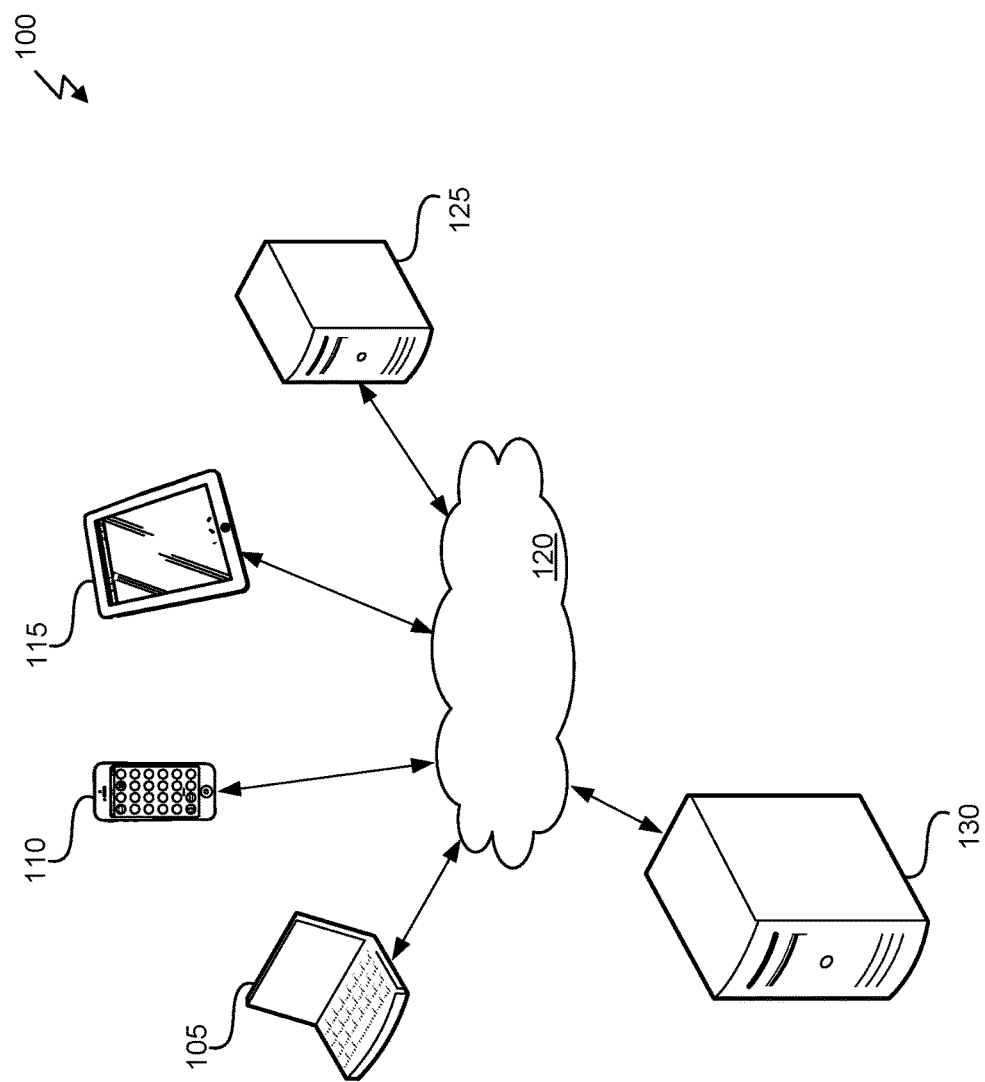
FIG. 1 illustrates a simplified diagram of a system for providing paywall-enabled streaming content onto social media platforms.

FIG. 1 illustrates a simplified diagram of a system 100 for paywall-enabled video streaming of content over social media platforms. The system 100 can include user devices 105, 110, and 115, a network 120, social media server 125, and content server 130.

User devices 105, 110, and 115 can be any device that is capable of displaying streamed content. For example, user devices 105, 110, and 115 can include laptop computers, desktop computers, tablet devices, smartphones, smart watches, or any other suitable computing device. While only 3 devices are depicted in FIG. 1, any number (more or fewer) of user devices 105, 110, and 115 can exist and communicate over network 120. The user devices 105, 110, and 115 can be, for example, computer system 1100 of FIG. 11.

Network 120 can be can be any type of network including the Internet, a local area network ("LAN"), a wide area network ("WAN"), a virtual network, a cloud network, or a telecommunications network. Network 120 can be implemented as a wired network and/or wireless network.

Social media server 125 can be any server that communicates over network 120. Social media server 125 can be, for example, computer system 1100 of FIG. 11. While only one social media server 125 is depicted in FIG. 1, any number (more or fewer) of social media servers 125 can communicate on network 120 to facilitate social media activities of users. Further, for each social media platform, one or more social media servers 125 can support the social media platform. Social media activities can include posting on social media platforms, sharing social media posts or other content with other users, viewing content from other users, friending other users, video chatting with other users, and so forth. Examples of social media sites and applications hosted by social media servers like social media server 125 include, for example, Facebook®, Twitter®, Snapchat®, Houseparty®, Google+®, MySpace®, LinkedIn®, Instagram®, Tumblr®, Flickr®, Reddit®, and Vine®.

Content server 130 can be a server that performs the methods described herein of paywall-enabled streaming content in a social media platform. Content server 130 can be, for example, computer system 1100 of FIG. 11. While a single content server 130 is depicted, any number (more or fewer) of content servers 130 can be used to perform paywall-enabled streaming content in a social media platform. For example, a server farm, cloud computing, or any other suitable multi-computer system can be used.

In use, users can utilize user devices 105, 110, and 115 to perform social media activities that are served or hosted by social media server 125 over network 120. Content server 130 can communicate with social media server 125 to provide content for display on the social media platform hosted by social media server 125. For example, social media server 125 can include a video aggregator that obtains the video content from content server 130. The video content served by content server 130 can include live broadcast content or stored video content. The content served by content server 130 can be provided to members that have paid for service through, for example, a subscription (e.g., monthly or yearly) or a single-use purchase. One aspect can include allowing one or more users of user devices 105, 110, and 115 to view video content from content server 130 via social media platform provided by social media server 125 without payment for a period of time. For example, social media server 125 can include in the social media feed for the user of user device 105 a viewing interface (e.g., application interface 340 of FIG. 3) for viewing broadcast content from content server 130. Social media server 125 can provide a begin time to content server 130 of the time in which the user of user device 105 began viewing content provided by content server 130. After a threshold period of time, content server 130 can provide a paywall to social media server 125 for display to the user of user device 105. Using the paywall, the user can respond with payment, subscription, or login information. Social media server 125 can provide the response information from the user of user device 105 to content server 130. Content server 130 can authenticate the user or validate payment and allow the user of user device 105 to continue to receive uninterrupted content from content server 130 via the social media platform provided by social media server 125. Alternatively, if the user is not authenticated or does not provide payment, the content from content server 130 can cease to be provided by social media server 125 to the user of user device 105. For example, the content server 130 can provide a cancel notice to social media server 125 for that user. As another example, the content can be obscured by the paywall, and until valid payment or authentication information is provided by the user, the content will continue to be obscured by the paywall.

Figure 2:
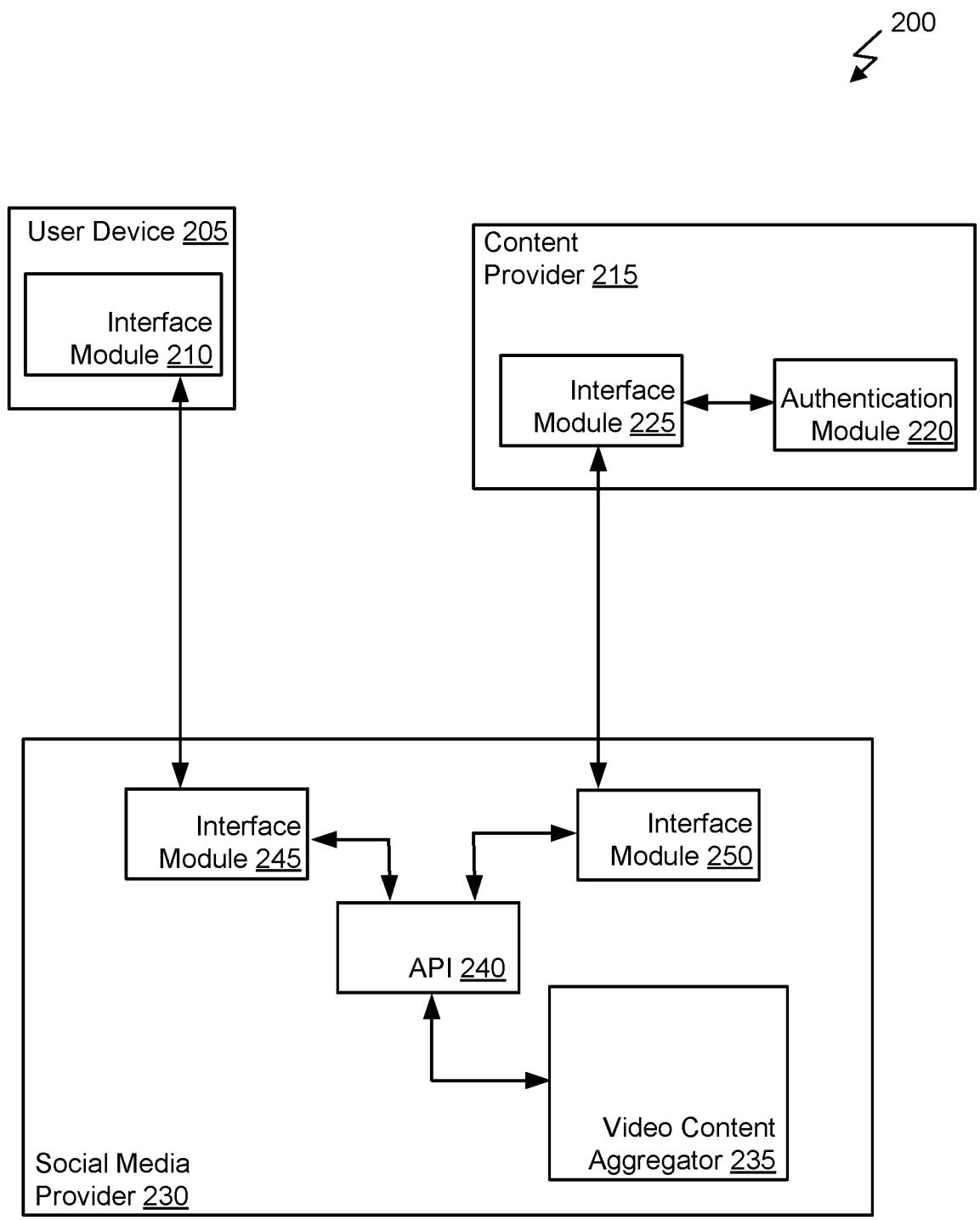
FIG. 2 illustrates a simplified block diagram of a system for providing paywall-enabled streaming content onto social media platforms.

FIG. 2 illustrates a simplified block diagram of a system 200 for paywall-enabled video streaming of content over social media platforms. System 200 can include user device 205, content provider 215, and social media provider 230.

User device 205 can be, for example, any of user devices 105, 110, and 115 of FIG. 1. User device 205 can include interface module 210. Interface module 210 can allow user device 205 to communicate with, for example, social media provider 230. The interface module can be, for example, included in an application installed on user device 205 provided by social media provider 230 that communicates through a network interface (not shown) over a network (not shown, e.g., network 120 of FIG. 1) with social media provider 230. The application installed on user device 205 can be, for example, a social media application. Alternatively, for example, the application can be a browser used to access a social media site (e.g., www.facebook.com).

Content provider 215 can be, for example, content server 130 of FIG. 1. Content provider 215 can include interface module 225 and authentication module 220. Interface module 225 can allow content provider 215 to communicate with, for example, social media provider 230. For example, interface module 225 can be part of an application on content provider 215 that communicates with social media provider 230 through interface module 250.

Social media provider 230 can be, for example, social media server 125 of FIG. 1. Social media provider 230 can include interface module 245, interface module 250, application programming interface ("API") 240, and video content aggregator 235. Interface module 245 can interface over a network with interface module 210 to allow user device 205 to communicate with social media provider 230. Interface module 250 can interface over a network with interface module 225 to allow content provider 215 and social media provider 230 to communicate. API 240 can be a programming interface into the social media provider 230 social media application. Video content aggregator 235 can be a content aggregator for the social media provider to allow video content submission by content providers.

In use, content provider 215 can provide content to social media provider 230 via interface modules 225 and 250. Once the content is received by the social media provider 230, the API 240 allows access to the video content aggregator 235, which aggregates the video content with content provided by other content providers.

User device 215 can execute an application for accessing the social media platform provided by social media provider 230. The application can communicate with social media provider 230 via interface modules 210 and 245. Once, for example, a request for video content from content provider 215 is issued from user device 205, social media provider 230 can provide the content to the application executing on user device 205 through interface modules 210 and 245.

Social media provider 230 can receive from, for example the application executing on the user device, a begin time for display of the video content provided by content provider 215 via interface modules 210 and 245. Social media provider 230 can provide, via API 240, interface module 250, and interface module 225, the begin time to content provider 215. When a threshold period of free viewing time is reached, content provider 215 can provide a paywall for display to the user. The paywall can be transmitted via the social media provider 230 through interface modules 210, 225, 245, and 250 and API 240. Optionally, the paywall can obscure the content being delivered to the user device 205. For example, the paywall may cover the majority of the display screen displaying the content such that the user cannot see the content until the paywall is satisfied. Optionally, the content can be paused until the paywall is satisfied. For example, the content can be paused so that once the paywall is satisfied, the content continues at the point in the content the paywall was raised. Optionally, the content can cease until the paywall is satisfied. For example, the content feed can stop so that once the paywall is satisfied, the content continues at the point in the content corresponding to the point in time of the satisfaction. Ceasing the content can be an option, for example, in a live broadcast.

Optionally, the user can respond to the paywall by, for example, entering subscription information for the content provider. For example, if the user is a subscriber to the content provider 215, the user can enter a username and password to satisfy the paywall. The username and password can be sent to the content provider 215 via the social media provider 230. The content provider 215 can authenticate the user with authentication module 220. If the authentication succeeds, the content provider can issue an authentication cookie, for example, to social media provider 230. Social media provider 230 can then continue to provide content from content provider 215 to user device 205. The authentication cookie can, for example, be used later if the user device 205 accesses content from content provider 215 to avoid interrupting content from content provider 215 with a paywall for that user/user device 205. For example, the social media provider 230 can link the authentication information with the profile for the user on the social media platform. That way if the user logs into the social media provider 230 from a different device, the paywall will not interrupt the user. The authentication information or cookie can be checked on future access to content from content provider 215 to ensure the subscription remains valid. For example, the social media provider 230 can validate the authentication cookie with the content provider 215. Optionally, rather than displaying the paywall, upon receiving the paywall from the content provider 215, the social media provider 230 can identify an existing authentication cookie from the content provider 215 on the user device 205. The social media provider 230 can request permission from the user to authorize the social media provider 230 to use the authentication cookie. If authorized, the social media provider 230 can use the existing authentication cookie to authenticate the user with content provider 215. If authenticated, the user can receive uninterrupted content on the user device 205 without display of the paywall.

Optionally, the user can respond to the paywall with payment information for the specific event the user is accessing. For example, the content the user is watching may be a movie and accessible for payment of $5.99 to the content provider 215. As another example, the content the user is watching may be an ultimate fighting championship ("UFC") fight and accessible for payment of $29.99. Once the specific show or event ends, the content from content provider 215 can end unless further payment is made through the paywall. The payment information can include, for example, a name and credit card information for the user. The payment information can be provided through the paywall to the content provider 215 via social media provider 230. Once content provider 215 receives the payment information, the authentication module can authenticate the payment and notify the social media provider 230 to allow access to the content paid for by the payment information.

Optionally, the user can respond to the paywall with registration and payment information to create a subscription or membership to content provided by content provider 215. The payment and registration information can be provided in a similar manner to the payment information for a specific event as described above. Once the payment information is authenticated by content provider 215 with authentication module 220, the content provider 215 can provide the authentication cookie to social media provider 230 as described above. The content provider 215 can also complete the registration of the user in its system by storing, for example, the user's name, payment information, subscription information (e.g., channels subscribed to), and so forth.

Figure 3:
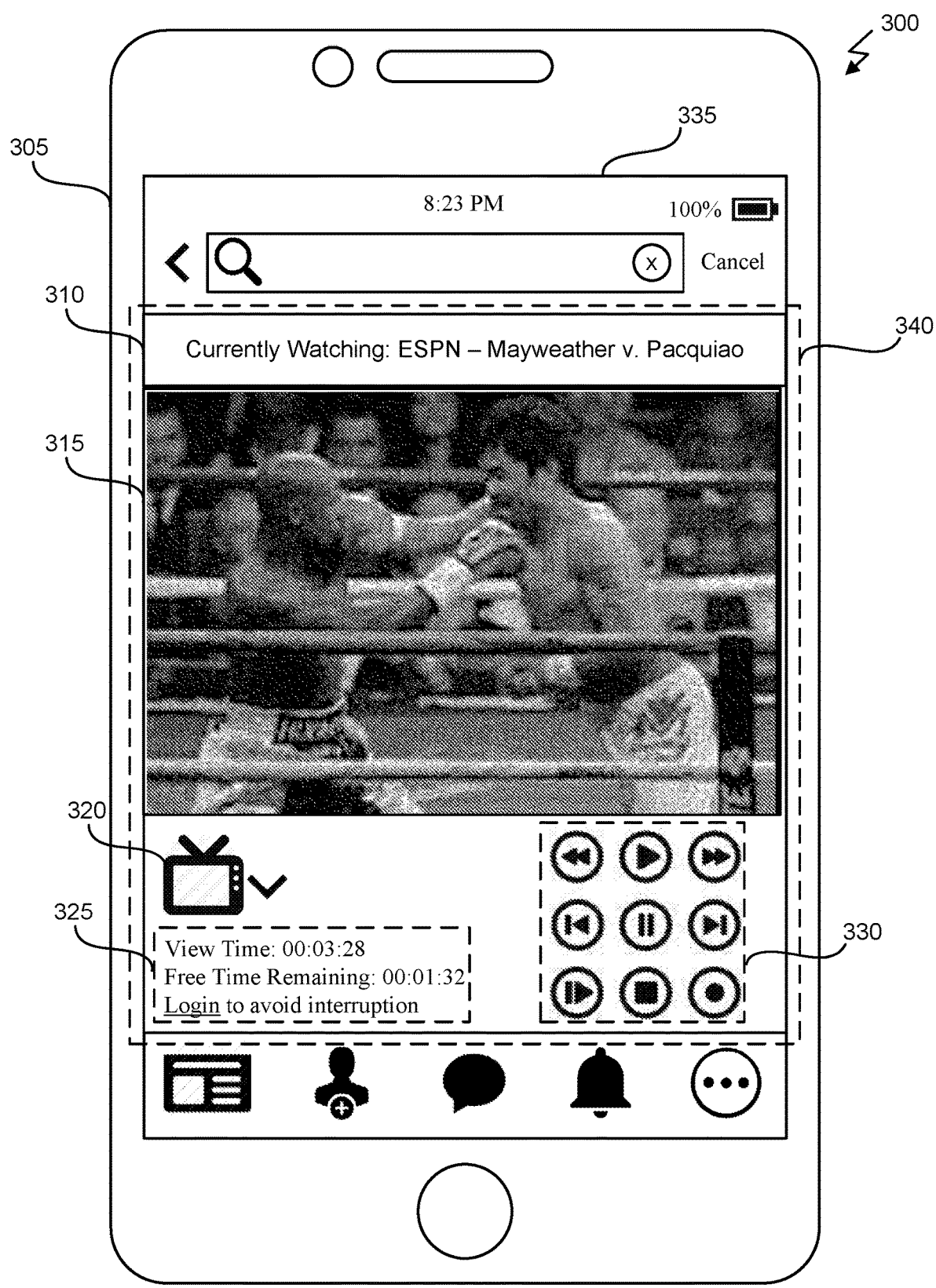
FIG. 3 illustrates an example interface depicting paywall-enabled streaming content onto social media platforms.

FIG. 3 illustrates an example interface 300 depicting paywall-enabled streaming content onto social media platforms. Interface 300 can include device 305. Device 305 can be, for example, user devices 105, 110, and 115 of FIG. 1. Device 305 can include screen 335, which can include application interface 340.

Application interface 340 can include a title 310, which can display what is currently being watched, for example. In FIG. 3, the title 310 shows "Currently Watching: ESPN—Mayweather v. Pacquiao." Application interface 340 can include the video feed 315. The video feed 315 can contain a stream of content from, for example, content provider 215 of FIG. 2.

Application interface 340 can further include a channel selector 320. Channel selector 320 can allow the user of device 305 to select a different channel from the content provider. For example, for a content provider that is offering live broadcast television, the user can select various channels using channel selector 320. The ESPN channel being displayed in FIG. 3 can be changed to NBC, for example. Upon selection of a different channel using channel selector 320, the modified channel can be utilized by the social media provider (e.g., social media provider 230 of FIG. 2) can pass the channel selection information to the content provider (e.g., content provider 215 of FIG. 2) through interfaces (e.g., interface modules 210, 225, 245, and 250). At that point, the content provider can authenticate the user for that channel or event. Optionally, if the user has not yet been authenticated, after viewing content from the content provider for a threshold period of time (regardless of the chosen channel), a paywall can be provided by the content provider for display in application interface 340. Optionally, the threshold period of time can be reset each time the user changes the channel, such that the paywall will only display if the user stays on a single channel for the threshold period of time.

Application interface 340 can further include data section 325. The data section 325 can include any relevant data or messages the content provider wants to provide to the user in the application interface 340. For example, as shown in FIG. 3, the information provided is the amount of time the user has been viewing content from the content provider. In FIG. 3, the user has been viewing the program for 3 minutes and 28 seconds. The data section 325 can also include the amount of free viewing time remaining. For example, in FIG. 3, the free time remaining is 1 minute and 32 seconds (for a total of 5 free viewing minutes). Another option for the user in the data section 325 is a link to login to avoid interruption. For example, if the user selects the link, the application interface 340 can display a small, unobstructive paywall that allows the user to enter login information. If, for example, the user provides login information through clicking the link, the paywall can be provided by the content provider through the social media provider. Once login information is received through the paywall, the social media provider can provide it to the content provider for authentication. Any other information can similarly be provided in data section 325.

Application interface 340 can further include viewing controls 330. Viewing controls 330 can include a play button, pause button, rewind button, stop button, record button, and so forth. Selection of these viewing controls can allow the user to control the viewing experience by, for example, rewinding to view a portion of the content again. Optionally, for live broadcasts, viewing controls 330 can be limited or removed. For example, only a pause and play button may be available. Additionally, viewing controls 330 can optionally be disabled during free viewing time.

In use, a user can use device 305 to access application interface 340. The user can navigate to access content from the content provider in their social media feed. For example, in the user's Facebook® news feed, a link to content provided by the content provider can be displayed. When the user selects the link, the application interface can provide the display as shown in FIG. 3. For other types of interfaces, such as HouseParty®, users can join a group call and one of the users can select the content to share within the group call, allowing access to the content by all members of the group call. Optionally, in a group call setting, only a single user may be required to login or pay for the content. Optionally, in a group call setting, each user can be provided with a paywall to enter payment or login information for themselves. Optionally, when each user is required to pay, the free viewing time can be identified for each user so that a paywall may not be displayed at the same time for each user. Alternatively, for example, the first user begin view time can be used as the begin time for each user in the group and the paywall can be displayed for each user at the same time.

Once the content is displayed, the user can select a channel using channel selector 320. Then, the user can use viewing controls 330 to stop, record, rewind, fast-forward, and so forth, their viewing experience. After the threshold period of time expires so that there is no free time remaining (which can be displayed in the data section 325), the content provider can transmit the paywall to the user as shown in the upcoming figures.

Figure 4:
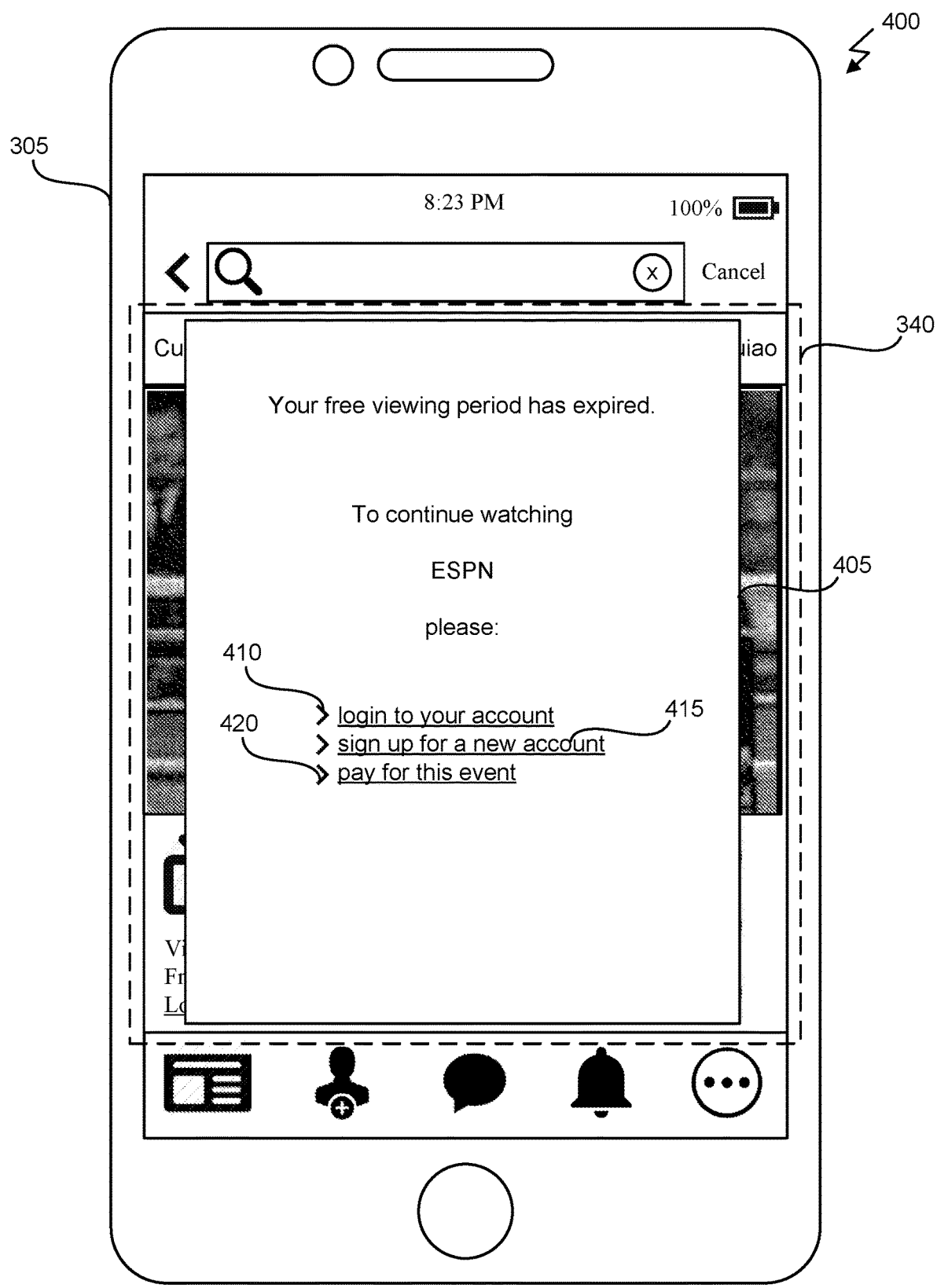
FIG. 4 illustrates another example interface depicting paywall-enabled streaming content onto social media platforms.

FIG. 4 illustrates an example interface 400 depicting paywall-enabled streaming content onto social media platforms. Interface 400 can include device 305. Device 305 can include application interface 340. The title 310, video feed 315, channel selector 320, data section 325, and viewing controls 330 as shown in FIG. 3 are obscured by paywall 405. As discussed previously, paywall 405 can be provided by the content provider to require the user to provide payment or login information to continue receiving and viewing video feed 315. As shown in paywall 405, there is a login link 410, signup link 415, and payment link 420. Each of those will be described in more detail herein.

In use, as shown in detail in further figures, the user can select login link 410 to enter login information for a subscription or membership the user already has with the content provider. The user can select signup link 415 to enter registration and payment information to sign up for a subscription or membership with the content provider. The user can select the payment link 420 to enter payment information for a single event, episode, or movie. Once the user enters the relevant information, the social media provider can receive the information through an API and forward the information to the content provider. The content provider can authenticate the user and/or payment and, upon success, provide an authentication cookie to the social media provider. The social media provider can then enable unobstructed viewing of the content from the content provider for that user. The social media provider can also associate the authentication with that user's social media profile so that the user can, on later logins to the social media platform for example, access content from the content provider without obstruction by the paywall. Each time the user accesses content from the content provider, the social media provider can confirm authentication with the content provider. This can avoid unauthorized viewing of content in case the user's subscription lapsed, for example. Using this authentication confirmation, the user can then access content from the content provider without unnecessary obstruction by the paywall while still ensuring content is not unauthorized.

Figure 5:
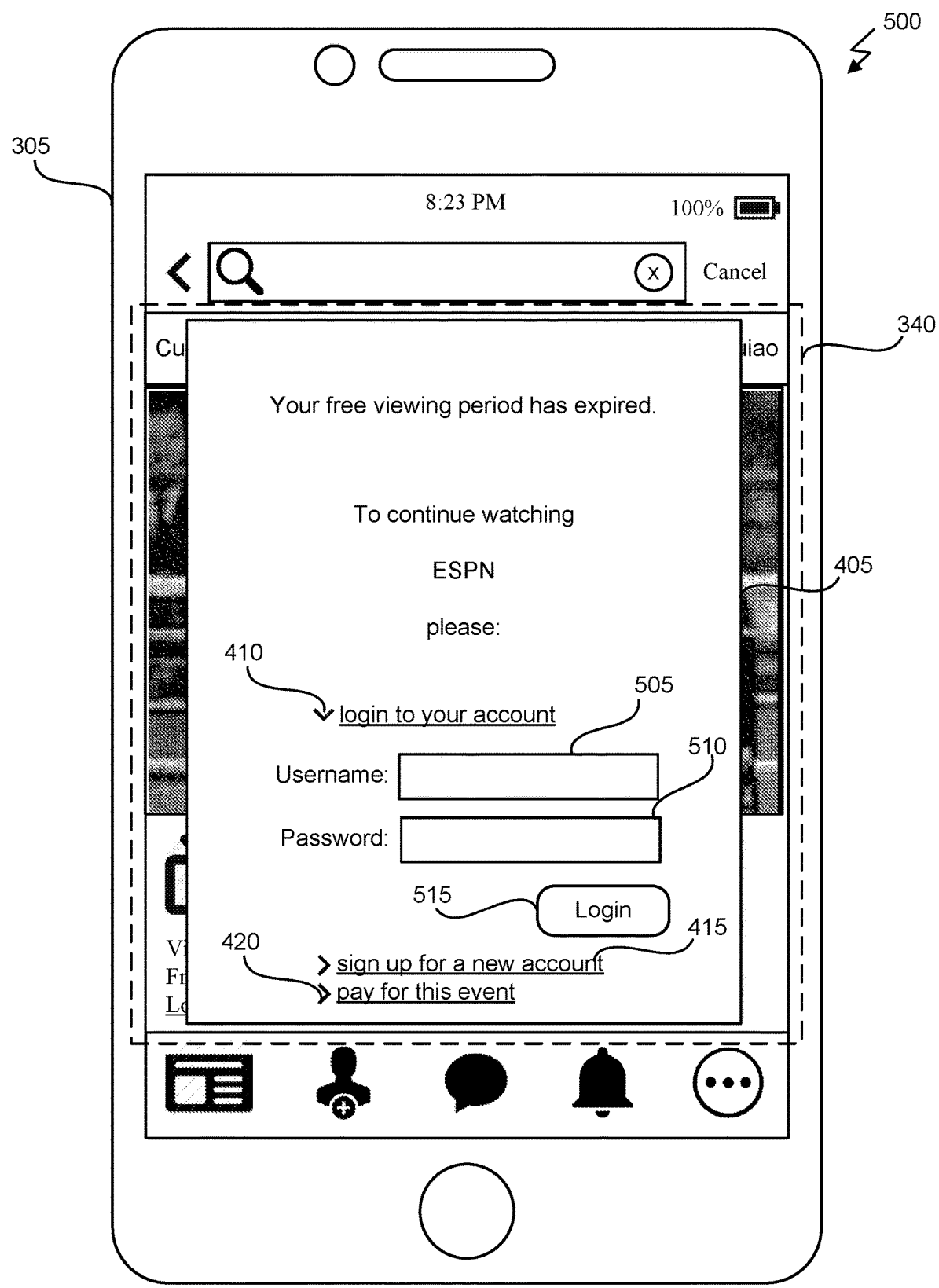
FIG. 5 illustrates another example interface depicting paywall-enabled streaming content onto social media platforms.

FIG. 5 illustrates an example interface 500 depicting paywall-enabled streaming content onto social media platforms. Interface 500 can include device 305. Device 305 can include application interface 340. The title 310, video feed 315, channel selector 320, data section 325, and viewing controls 330 as shown in FIG. 3 are obscured by paywall 405. In paywall 405, the login link 410 has been selected to expand the view. Signup link 415 and payment link 420 are still available on the paywall 405. The login link 410 expansion shows that a username entry box 505 and a password entry box 510 can be entered and the login button 515 can be selected to submit the username entered in username entry box 505 and the password entered in password entry box 510 to the content provider via the social media provider. The content provider can authenticate the user using the entered username and password. If the authentication is successful, the content provider can provide an authentication cookie to the social media provider. The social media provider can remove the paywall from display so that the display looks like the display in FIG. 8. If the authentication fails, the content provider can provide a failure message for the social media provider to use to display information to the user that the login failed. If the authentication succeeds, the authentication cookie can be used by the social media provider to, for example, associate the user with authorized delivery from the content provider for future access.

Figure 6:
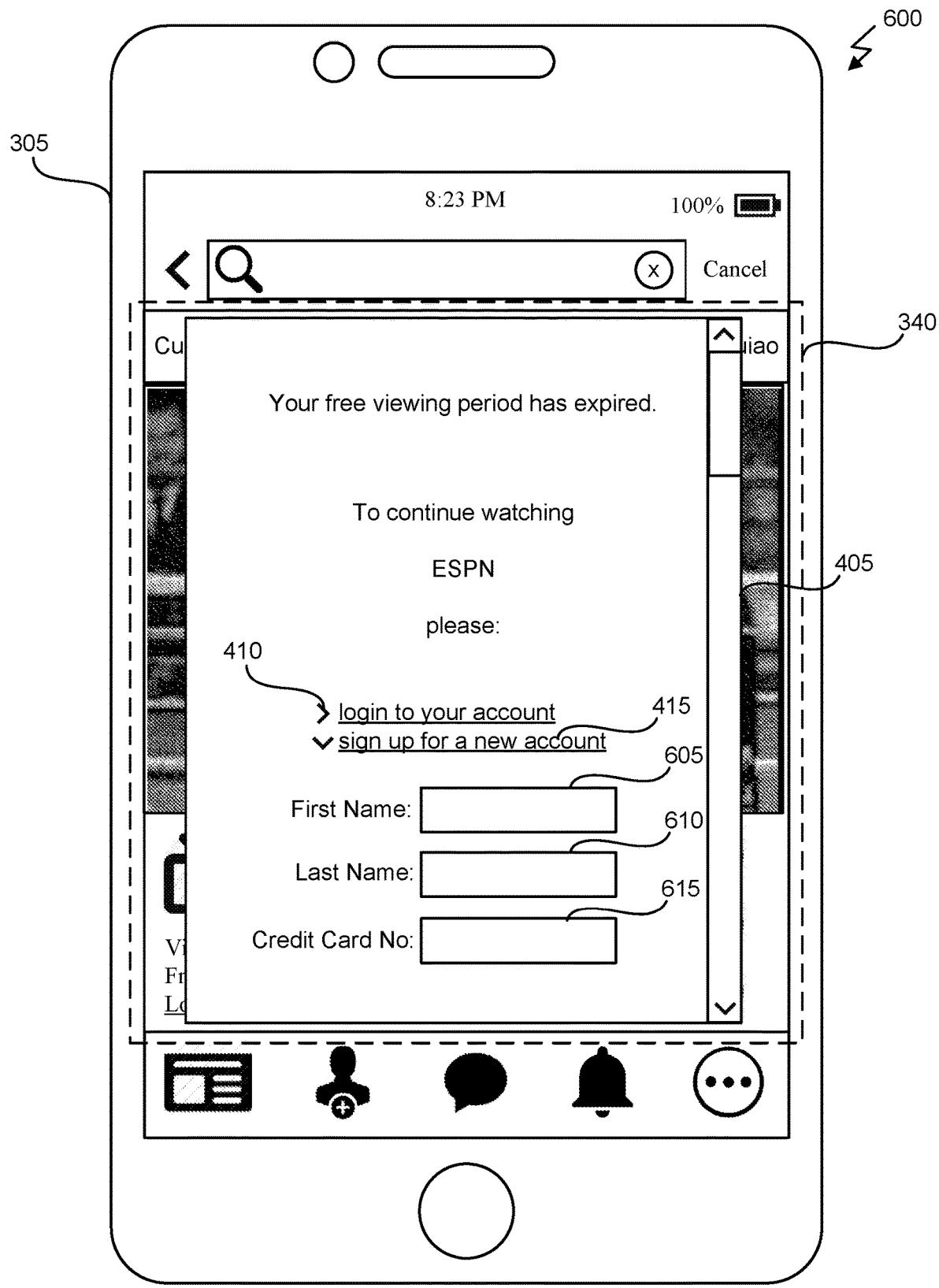
FIG. 6 illustrates another example interface depicting paywall-enabled streaming content onto social media platforms.

FIG. 6 illustrates an example interface 600 depicting paywall-enabled streaming content onto social media platforms. Interface 600 can include device 305. Device 305 can include application interface 340. The title 310, video feed 315, channel selector 320, data section 325, and viewing controls 330 as shown in FIG. 3 are obscured by paywall 405. In paywall 405, the signup link 415 has been selected to expand the view. Login link 410 and payment link 420 can be still available on the paywall 405. Some information may fall below the viewable portion of the screen, so a scroll bar can be provided. The signup link 415 expansion shows that a first name entry box 605, a last name entry box 610, and a credit card number entry box 615 can be provided. Other entry boxes can include address, selection of a username and password, and so forth. A sign up button can be included if the user scrolls down the paywall to submit the answers entered in the entry boxes 605, 610, and 615 to the content provider through the social media provider. The content provider can create a new account and authenticate the user using the entered information. Once complete, the content provider can issue a notification to the social media provider to remove the paywall from display so that the display looks like the display in FIG. 8. An authentication cookie can be used by the social media provider to, for example, associate the user with authorized delivery from the content provider for future access. The authentication cookie can be provided by the content provider.

Figure 7:
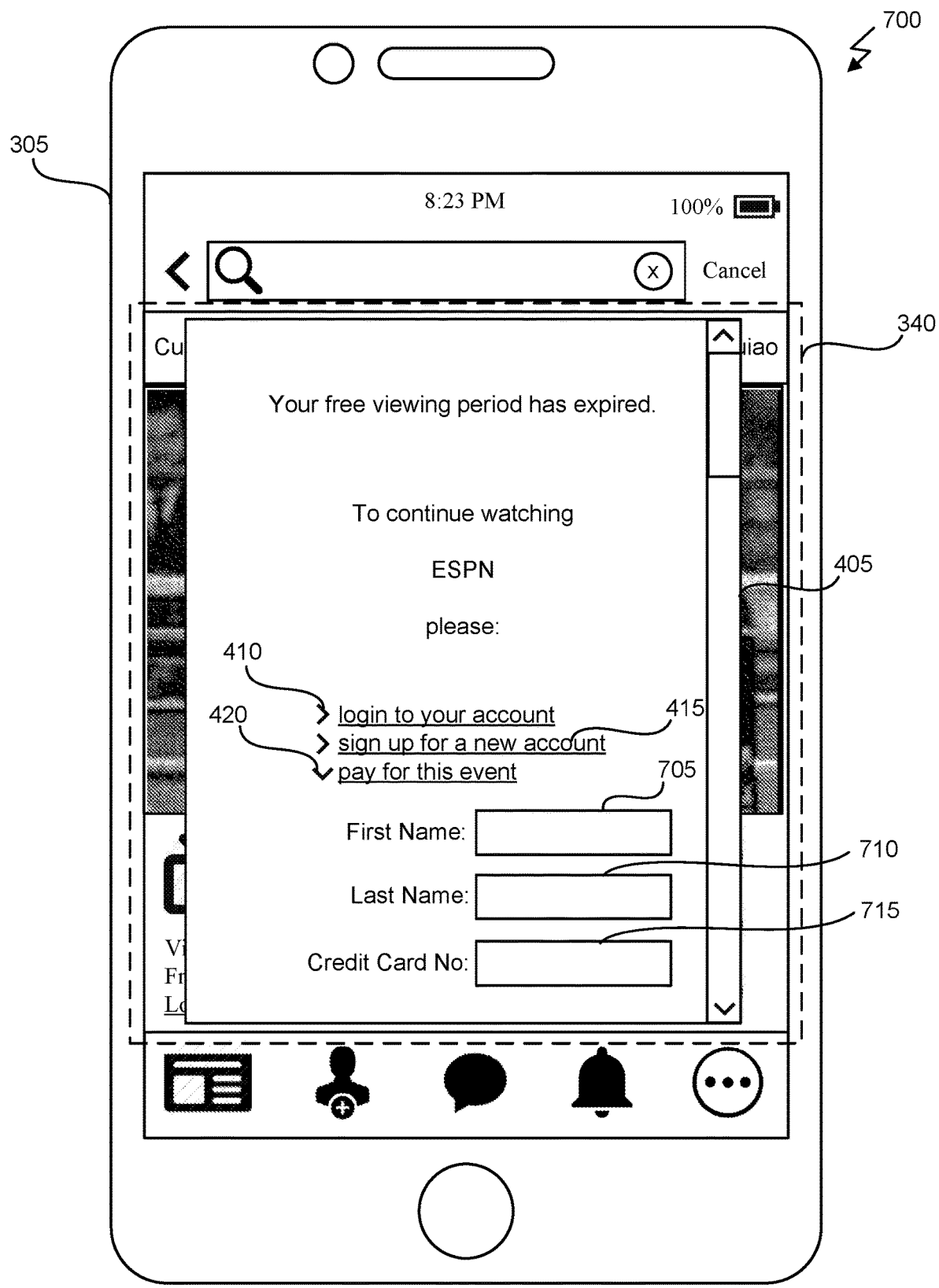
FIG. 7 illustrates another example interface depicting paywall-enabled streaming content onto social media platforms.

FIG. 7 illustrates an example interface 700 depicting paywall-enabled streaming content onto social media platforms. Interface 700 can include device 305. Device 305 can include application interface 340. The title 310, video feed 315, channel selector 320, data section 325, and viewing controls 330 as shown in FIG. 3 are obscured by paywall 405. In paywall 405, the payment link 425 has been selected to expand the view. Login link 410 and signup link 415 are still available on the paywall 405. The information may fall below the viewable portion of the screen, so a scroll bar can be provided. The payment link 420 expansion shows that a first name entry box 705, a last name entry box 710, and a credit card number entry box 715 can be provided. Other entry boxes can include address, other credit card verification information, and so forth. A pay button can be included if the user scrolls down the paywall to submit the answers entered in the entry boxes 705, 710, and 715 to the content provider through the social media provider. The content provider can authorize the payment using the entered information. Once complete, the content provider can issue a notification to the social media provider to remove the paywall from display so that the display looks like the display in FIG. 8.

Figure 8:
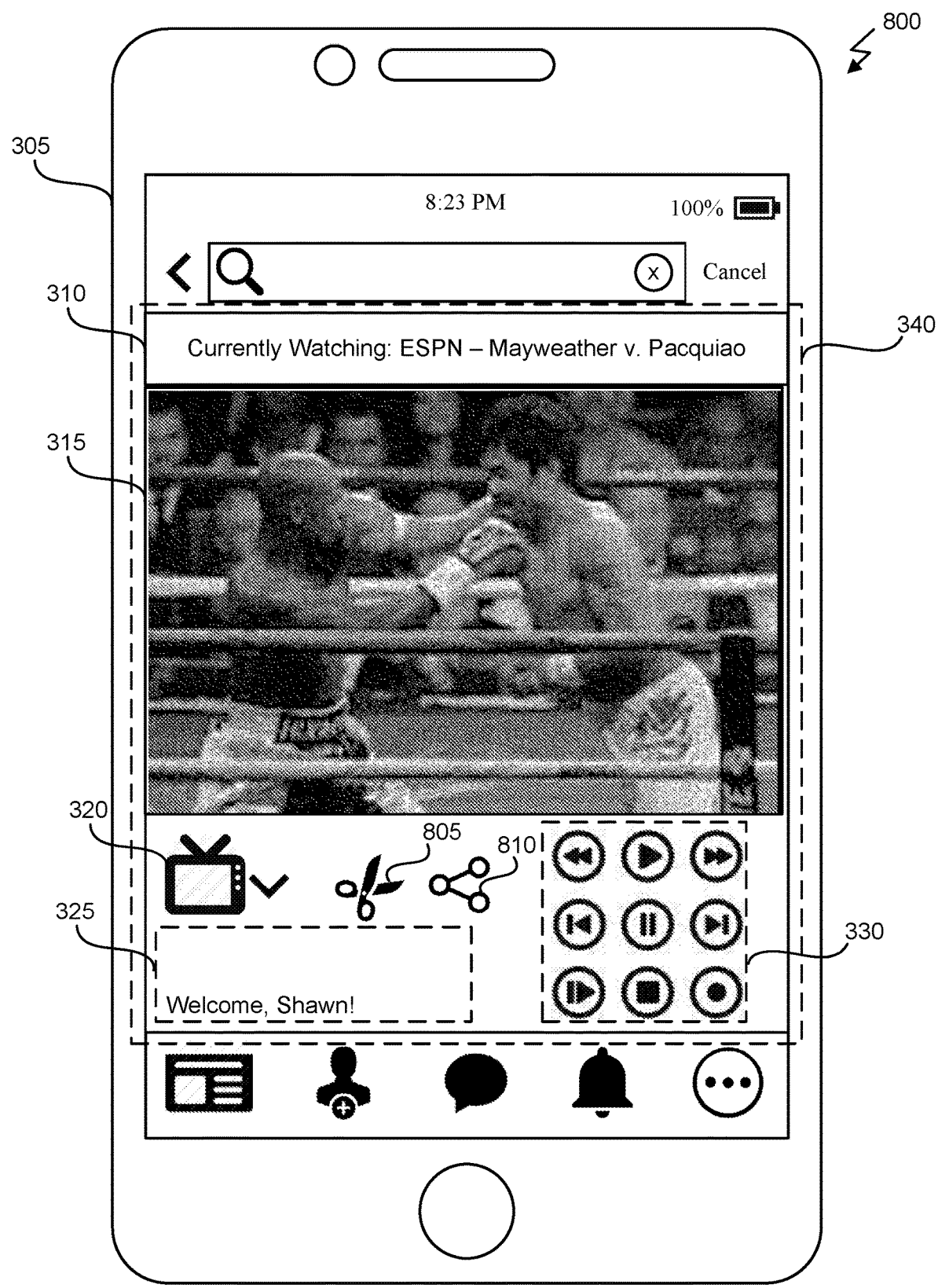
FIG. 8 illustrates another example interface depicting paywall-enabled streaming content onto social media platforms.

FIG. 8 illustrates an example interface 800 depicting paywall-enabled streaming content onto social media platforms. The paywall 405 can be removed after the user has been authenticated for payment. The data section 325 can be updated with new information. The information can include, for example, a welcome message. Notifications including service interruptions or other information can also be provided in data section 325.

The application interface 340 can include a cut button 805. Selecting the cut button 805 can clip the currently running portion of the content for a selected portion of the content that is selected by the user. The clip can be stored or shared with other friends on the social media platform, for example. The clip can be edited by the user. For example, a note can be added by the user (e.g., "I love this part!"). Augmented reality filters can be applied to the clip to adjust the color, tone, or place additional elements into the clip. For example, the user can include a short clip of himself or image of himself in the clip to make it appear that he or she was in the content. The modified clip can be saved by the user and stored by the social media provider using the video content aggregator (e.g., video content aggregator 235 of FIG. 2). The clip can then be, for example, retrieved by the user, shared with other users, posted on the user's profile, or shared so the clip appears in other user's news feeds. The redistribution of the modified clip can also be subject to the paywall as described herein.

The application interface 340 can include a share button 810. Selecting the share button 810 can allow the user to share the content with another user on the social media platform. For example, a "friend" on the social media platform can be selected to share the content with. Sharing the content can allow the other user to see the content for free for the threshold period of time before the content provider provides a paywall for that user to either login, signup, or pay for the content as described herein.

Figure 9:
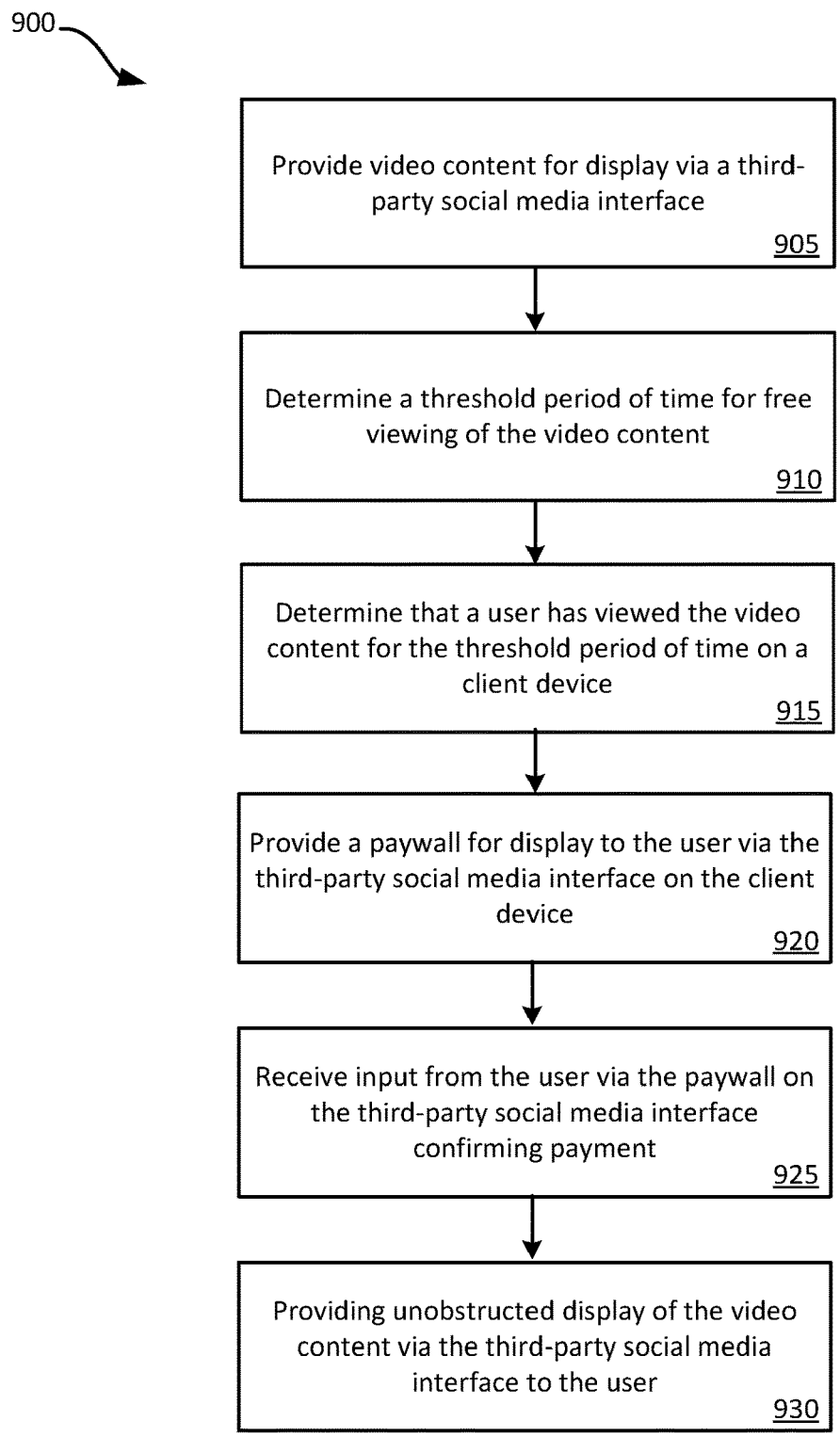
FIG. 9 illustrates a flowchart depicting an example process for paywall-enabled streaming content onto social media platforms.

FIG. 9 illustrates a flowchart depicting an example process 900 for paywall-enabled streaming content onto social media platforms. Process 900 can be performed by, for example, content server 130 of FIG. 1. Process 900 can begin with providing video content for display via a third-party social media interface at 905. The social media interface can be, for example, application interface 340 of FIG. 3. The third-party social media provider can be, for example, Facebook®, Twitter®, Houseparty®, or any other suitable third-party social media provider. A suitable social media provider may have the ability to, for example, distribute the content at a sufficient resolution. The content can be, for example, video content including live broadcasting or stored video content. The content provider can typically provide video content based on paid subscriptions (or memberships) or pay-per-view.

At 910, the content server can determine a threshold period of time for free viewing of the content. The threshold period of time can be, for example, 5 minutes. The threshold period of time can optionally be different depending on the displayed programming. For example, a 30 minute broadcast episode of a comedy may only be free to view for 3 minutes, but a 2.5 hour movie might be free to view for 10 minutes. A broadcast live television event, such as a UFC fight, may be free to view for only 2 minutes, for example. Further, the threshold period of time for free viewing of the content can be dependent upon the user. For example, a user referred from a subscriber may receive a longer free viewing period than a user that clicked an advertisement for the service on their news feed.

At 915, the content server can determine that a user has viewed the video content for the threshold period of time on a client device. For example, the user device can provide to the social media provider the begin time for viewing the content. The user's browser or social media application can capture the begin time for the user viewing the content. The begin time can be provided to the content provider. Once the threshold period of time has been reached, the content provider can determine the user has viewed the video content for the threshold period of time.

At 920, the content server can provide a paywall for display to the user via the third-party social media interface on the client device. The paywall can be, for example, paywall 405 of FIG. 4. The paywall can be provided as described, for example, with respect to FIG. 2.

At 925, the content server can receive input from the user via the paywall on the third-party social media interface confirming payment. For example, the user can enter a username and password for an existing paid membership or subscription. As another example, the user can enter payment information to view the single event or content currently being viewed. As another example, the user can enter payment and personal information to register for a membership or subscription. The entered information can be provided through the paywall to the social media provider, which is sent to the content provider from the social media provider.

At 930, the content server can provide unobstructed display of the video content via the third-party social media interface to the user. For example, the content server can provide an authentication cookie to the social media provider to validate the user's access to the content. The social media provider can then allow access to the content and remove display of the paywall on the social media interface for the user.

Figure 10:
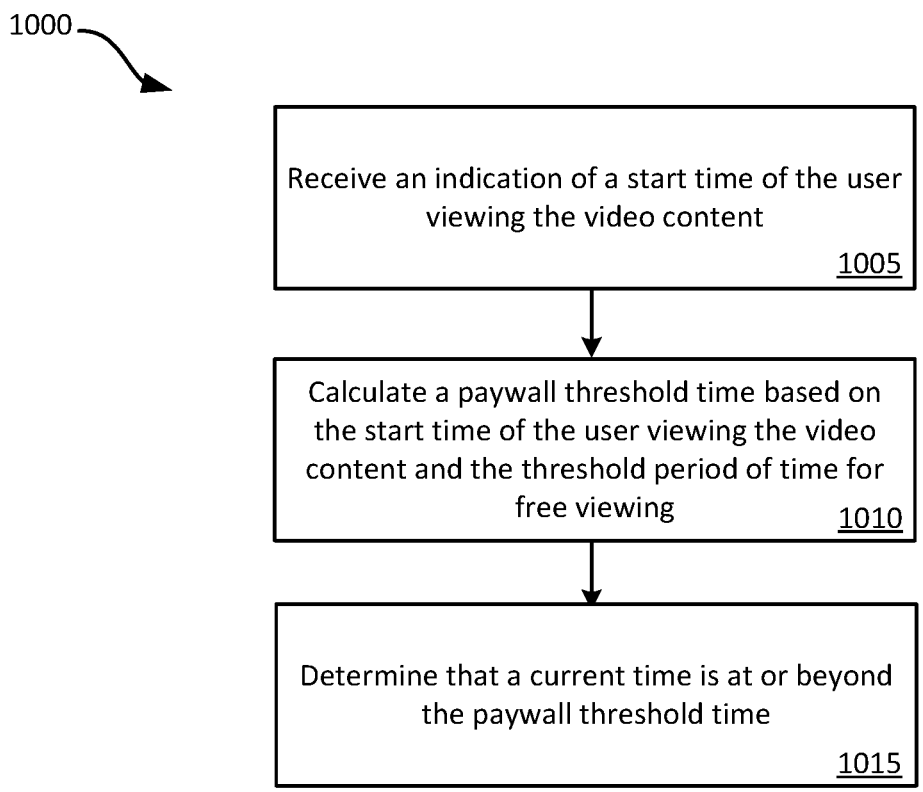
FIG. 10 illustrates another flowchart depicting an example process for paywall-enabled streaming content onto social media platforms.

FIG. 10 illustrates a flowchart depicting an example process 1000 for paywall-enabled streaming content onto social media platforms. Process 1000 can be performed by, for example, content server 130 of FIG. 1. Process 1000 can provide more detail into the content server's determination that the user has viewed the content for the threshold period of time for free viewing. At 1005, the content server can receive an indication of a start time of the user viewing the video content. As discussed with respect to 915 of FIG. 9, the browser or application can provide the start time and provide it to the content server via the social media provider.

At 1010, the content server can calculate a paywall threshold time based on the start time of the user viewing the video content and the threshold period of time for free viewing. As discussed above, the threshold period of time for free viewing may depend on the type of content. The content server can identify the start time (e.g., 1:42 pm) and the threshold period of time for free viewing (e.g., 3 minutes) and determine based on that information the paywall threshold time (e.g., 1:45 pm).

At 1015, the content server can determine that a current time is at or beyond the paywall threshold time. For example, the content server can do a periodic check for the current time and compare it with the paywall threshold time. If the current time is past the paywall threshold time, the content server can determine that the current time is beyond the paywall threshold time. Once that is complete, the content server can determine that the user has viewed the video content for the threshold period of time.

Optionally, the threshold period of time for free viewing can be different for different users. For example, a special customer relationship may exist with a partner that is known to the content provider such that a first user has only 2 minutes of free viewing time while a second user that has a special customer relationship is allowed 6 minutes of free viewing time.

Optionally, the viewing time of each specific user can be tracked. For example, a first user on the social media platform can begin to watch the content and have a first start time (e.g., 3:16 pm). A second user on the social media platform can begin to watch the same content, which can optionally be a live broadcast so the second user does not begin watching the content at the same point in the content as the first user. The second user can have a second start time (e.g., 3:18 pm). If the threshold period of free time to watch the content is 5 minutes for each user, the first user will receive a paywall at 3:21 pm, and the second user will receive a paywall at 3:23 pm.

Figure 11:
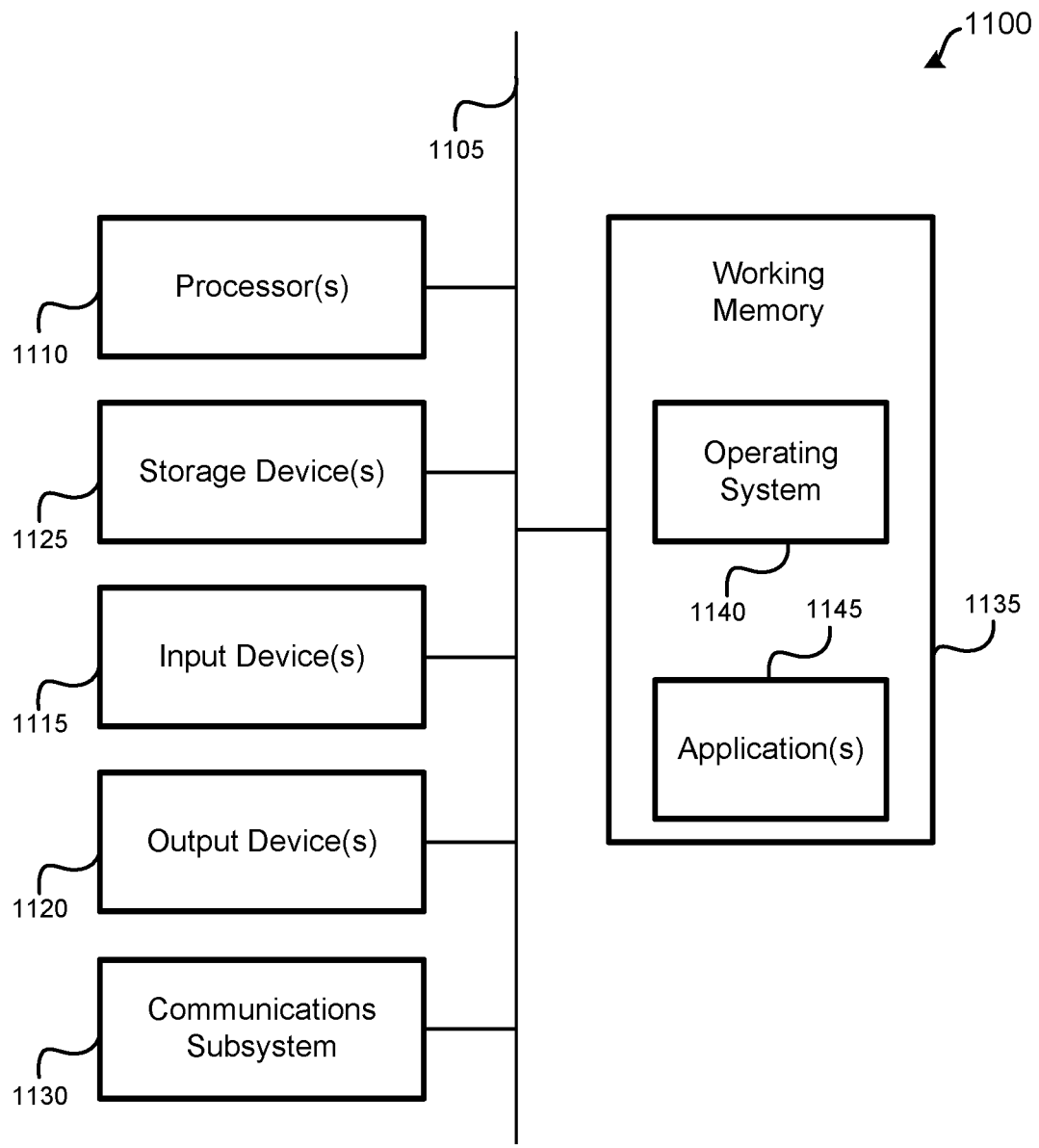
FIG. 11 illustrates an embodiment of a computer system.

FIG. 11 illustrates an embodiment of a computer system 1100. A computer system 1100 as illustrated in FIG. 11 may be incorporated into devices such as a television receiver, DVR, television, media system, personal computer, smartphone, tablet, and the like. FIG. 11 provides a schematic illustration of one embodiment of a computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105, or may otherwise be in communication, as appropriate. The hardware elements may include one or more processors 1110 (e.g., processor 152 and processor 194 of FIG. 1), including without limitation one or more general-purpose processors and/or one or more special-purpose processors such as digital signal processing chips, graphics acceleration processors, and/or the like; one or more input devices 1115, which can include without limitation a mouse, a keyboard, a camera, a remote control, and/or the like; and one or more output devices 1120, which can include without limitation a display device, a printer, and/or the like.

The computer system 1100 may further include and/or be in communication with one or more non-transitory computer-readable storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1130 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1130. In other embodiments, a portable electronic device may be incorporated into the computer system 1100 as an input device 1115. In many embodiments, the computer system 1100 will further comprise a working memory 1135, which can include a RAM or ROM device, as described above.

The computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 9 and 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1100 to perform methods in accordance with various embodiments of the technology. According to a set of embodiments, some or all of the procedures of such methods are performed by the computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method, comprising:
receiving, by a computer system of a content provider from a third-party social media application running on a client device of a user, a request to display live broadcast television content via a third-party social media interface of the third-party social media application, the live broadcast television content provided by the content provider via a plurality of content channels;
detecting, by the computer system, that the user is not presently authorized to view the live broadcast television content accessible from the content provider via the third-party social media application;
first providing video content, by the computer system to the third-party social media application, in response to the request, such that the video content is from a first of the plurality of content channels for display via the third-party social media interface of the third-party social media application;
receiving, by the computer system from the third-party social media application, channel selection information in accordance with the user interacting with a channel selector of the third-party social media interface, the user interacting indicating selection of a second of the plurality of content channels;
second providing the video content, by the computer system to the third-party social media application, in response to the channel selection information, such that the video content is from the second of the plurality of content channels for display via the third-party social media interface of the third-party social media application;
determining, by the computer system, in accordance with the detecting and the providing, that the user has viewed multiple of the plurality of content channels for at least a threshold period of time associated with free viewing of the live broadcast television content via the third-party social media interface;
providing, by the computer system to the third-party social media application, in response to the determining, a paywall for display to the user via the third-party social media interface on the client device in a manner that at least partially graphically obscures the video content;
receiving, by the computer system from the third-party social media application, responsive to providing the paywall, input from the user via the paywall on the third-party social media interface; and
authorizing the user, by the computer system, responsive to receiving the input, to continue with graphically unobscured viewing of the video content on the client device via the third-party social media interface.

2. The method of claim 1, wherein determining that the user has viewed the video content for the threshold period of time comprises:
receiving, by the computer system, an indication of a start time of the user viewing the video content;
calculating, by the computer system, a paywall threshold time based on the start time of the user viewing the video content and the threshold period of time for free viewing; and
determining, by the computer system, that a current time is at or beyond the paywall threshold time.

3. The method of claim 1, wherein the user is a first user of a plurality of users, the method further comprising:
for each user of the plurality of users:
determining that the user has viewed the video content for the threshold period of time; and
providing, by the computer system, the paywall for display to the user; and
wherein the video content is a live television broadcast and at least one of the users of the plurality of users began viewing the video content at a different time than other users of the plurality of users.

4. The method of claim 1, wherein the user shares the video content with a second user via the third-party social media interface.

5. The method of claim 1, wherein the user creates a clip of a portion of the video content and shares the clip with a second user via the third-party social media interface.

6. The method of claim 1, further comprising:
providing, by the computer system to the third-party social media application responsive to authorizing the user, an authorization cookie to authorize graphically unobstructed display of the video content via the third-party social media interface to the user, the authorization cookie issued by the content provider of the video content to a social media provider of the third-party social media application, thereby providing authorization by the content provider to the social media provider to provide the graphically unobstructed display of the video content via the third-party social media interface to the user.

7. The method of claim 1, wherein determining that the user has viewed the video content for the threshold period of time comprises:
resetting, by the computer system, the threshold period of time in response to receiving the channel selection information in association with beginning the second providing.

8. A system, comprising:
a processor; and
a memory comprising instructions that, when executed by the processor, cause the processor to:
receive, from a third-party social media application running on a client device of a user, a request to display live broadcast television content via a third-party social media interface of the third-party social media application, the live broadcast television content provided by a content provider via a plurality of content channels;

detect that the user is not presently authorized to view the live broadcast television content accessible from the content provider via the third-party social media application;

first provide video content, in response to the request, such that the video content is from a first of the plurality of content channels to the third-party social media application for display via the third-party social media interface of the third-party social media application;

receive, from the third-party social media application, channel selection information in accordance with the user interacting with a channel selector of the third-party social media interface, the user interacting indicating selection of a second of the plurality of content channels;

second provide the video content, in response to the channel selection information, such that the video content is from the second of the plurality of content channels for display via the third-party social media interface of the third-party social media application;

determine in accordance with the detecting and the second providing, that the user has viewed multiple of the plurality of content channels for at least a threshold period of time associated with free viewing of the live broadcast television content via the third-party social media interface;

provide to the third-party social media application, in response to the determining, a paywall for display to the user via the third-party social media interface in a manner that at least partially graphically obscures the video content;

receive input from the user via the paywall on the third-party social media interface; and authorizing the user, responsive to receiving the input, to continue with graphically unobscured viewing of the video content on the client device via the third-party social media interface.

9. The system of claim 8, wherein the instructions for determining that the user has viewed the video content for the threshold period of time comprise further instructions that, when executed by the processor, cause the processor to:
receive an indication of a start time of the user viewing the video content;
calculate a paywall threshold time based on the start time of the user viewing the video content and the threshold period of time for free viewing; and
determine that a current time is at or beyond the paywall threshold time.

10. The system of claim 8, wherein the user is a first user of a plurality of users, and wherein the instructions comprise further instructions that, when executed by the processor, cause the processor to:
for each user of the plurality of users:
determine that the user has viewed the video content for the threshold period of time; and
provide the paywall for display to the user; and
wherein the video content is a live television broadcast and at least one of the users of the plurality of users began viewing the video content at a different time than other users of the plurality of users.

11. The system of claim 8, wherein the user shares the video content with a second user via the third-party social media interface.

12. The system of claim 8, wherein the user creates a clip of a portion of the video content and shares the clip with a second user via the third-party social media interface.

13. The system of claim 8, wherein the instructions, when executed by the processor, cause the processor further to:
provide an authorization cookie to the third-party social media application responsive to determining that the user is authorized, the authorization cookie to authorize graphically unobstructed display of the video content via the third-party social media interface to the user, the authorization cookie issued by the content provider of the video content to a social media provider of the third-party social media application, thereby providing authorization by the content provider to the social media provider to provide the graphically unobstructed display of the video content via the third-party social media interface to the user.

14. The system of claim 8, wherein the instructions, when executed by the processor, cause the processor to determine that the user has viewed the video content for the threshold period of time by:
resetting the threshold period of time in response to receiving the channel selection information in association with beginning the second providing.

15. A non-transitory, computer-readable storage device storing instructions thereon which, when executed by a processor, cause the processor to:
receive, from a third-party social media application running on a client device of a user, a request to display live broadcast television content via a third-party social media interface of the third-party social media application, the live broadcast television content provided by a content provider via a plurality of content channels;

detect that the user is not presently authorized to view the live broadcast television content accessible from the content provider via the third-party social media application;

first provide video content, in response to the request, such that the video content is from a first of the plurality of content channels to the third-party social media application for display via the third-party social media interface of the third-party social media application;

receive, from the third-party social media application, channel selection information in accordance with the user interacting with a channel selector of the third-party social media interface, the user interacting indicating selection of a second of the plurality of content channels;

second provide the video content, in response to the channel selection information, such that the video content is from the second of the plurality of content channels for display via the third-party social media interface of the third-party social media application;

determine in accordance with the detecting and the second providing, that the user has viewed multiple of the plurality of content channels for at least a threshold period of time associated with free viewing of the live broadcast television content via the third-party social media interface;

provide to the third-party social media application, in response to the determining, a paywall for display to the user via the third-party social media interface in a manner that at least partially graphically obscures the video content;

receive input from the user via the paywall on the third-party social media interface; and authorizing the user, responsive to receiving the input, to continue with graphically unobscured viewing of the video content on the client device via the third-party social media interface.

16. The non-transitory, computer-readable storage device of claim 15, wherein the instructions for determining that the user has viewed the video content for the threshold period of time comprise further instructions that, when executed by the processor, cause the processor to:
receive an indication of a start time of the user viewing the video content;
calculate a paywall threshold time based on the start time of the user viewing the video content and the threshold period of time for free viewing; and
determine that a current time is at or beyond the paywall threshold time.

17. The non-transitory, computer-readable storage device of claim 15, wherein the user shares the video content with a second user via the third-party social media interface.

18. The non-transitory, computer-readable storage device of claim 15, wherein the user creates a clip of a portion of the video content and shares the clip with a second user via the third-party social media interface.

19. The non-transitory, computer-readable storage device of claim 15, wherein the instructions, when executed by the processor, cause the processor further to:
provide an authorization cookie to the third-party social media application responsive to determining that the user is authorized, the authorization cookie to authorize graphically unobstructed display of the video content via the third-party social media interface to the user, the authorization cookie issued by the content provider of the video content to a social media provider of the third-party social media application, thereby providing authorization by the content provider to the social media provider to provide the graphically unobstructed display of the video content via the third-party social media interface to the user.

20. The non-transitory, computer-readable storage device of claim 15, wherein the instructions, when executed by the processor, cause the processor to determine that the user has viewed the video content for the threshold period of time by:
resetting the threshold period of time in response to receiving the channel selection information in association with beginning the second providing.

* * * * *